(12) United States Patent
Miyanaga et al.

(10) Patent No.: US 12,434,773 B2
(45) Date of Patent: Oct. 7, 2025

(54) VEHICLE BODY SIDE STRUCTURE

(71) Applicant: HONDA MOTOR CO., LTD., Tokyo (JP)

(72) Inventors: Hiroyo Miyanaga, Wako (JP); Koichi Takahashi, Wako (JP); Naoyuki Saruwatari, Wako (JP); Takayuki Soma, Wako (JP); Masayasu Yoshida, Wako (JP); Satoru Kawabe, Wako (JP); Hisashi Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/659,035

(22) Filed: May 9, 2024

(65) Prior Publication Data

US 2024/0375720 A1    Nov. 14, 2024

(30) Foreign Application Priority Data

May 12, 2023    (JP) .................................. 2023-079267

(51) Int. Cl.
*B60G 13/00*    (2006.01)
*B62D 25/08*    (2006.01)
(Continued)

(52) U.S. Cl.
CPC ........... *B62D 25/16* (2013.01); *B60G 13/003* (2013.01); *B60G 2204/128* (2013.01)

(58) Field of Classification Search
CPC ............ B60G 13/003; B60G 2204/128; B62D 25/08; B62D 25/088; B62D 25/16;
(Continued)

(56) References Cited

U.S. PATENT DOCUMENTS

2004/0232647 A1    11/2004    Kim
2020/0269928 A1*    8/2020    Ishimoto .................. B60R 22/34

FOREIGN PATENT DOCUMENTS

CN    1919493 A    *    2/2007
JP    56-087375         7/1981
(Continued)

OTHER PUBLICATIONS

Description Translation for JP 2007253179 from Espacenet (Year: 2007).*

(Continued)

*Primary Examiner* — Jason D Shanske
*Assistant Examiner* — Daniel M. Keck
(74) *Attorney, Agent, or Firm* — Amin, Turocy & Watson, LLP

(57) ABSTRACT

This vehicle body side structure includes a wheel house disposed at a side portion of a vehicle body to surround an upper outer circumference and a vehicle width direction inner side of a wheel, and a damper base fixed to an inner surface of an upper region of the wheel house to support an upper part of a damper of a suspension, in which an upwardly convex three-dimensional curved surface portion curved in all of a side view, a front-rear view, and a vertical view without an inflection point is provided in the upper region of the wheel house, and the damper base is fixed to an inner surface of the three-dimensional curved surface portion.

5 Claims, 6 Drawing Sheets

(51) Int. Cl.
*B62D 25/16* (2006.01)
*B62D 25/18* (2006.01)

(58) Field of Classification Search
CPC ...... B62D 25/163; B62D 25/18; B62D 25/20; B62D 25/2009
USPC .................................................. 280/124.108
See application file for complete search history.

(56) References Cited

FOREIGN PATENT DOCUMENTS

| | | | |
|---|---|---|---|
| JP | 61-039673 | | 3/1986 |
| JP | 09-323667 | | 12/1997 |
| JP | 2004-345624 | | 12/2004 |
| JP | 2007253179 A | * | 10/2007 |
| JP | 2012006507 A | * | 1/2012 |
| JP | 2013-189102 | | 9/2013 |
| JP | 2015-074263 | | 4/2015 |
| JP | 2018-020643 | | 2/2018 |

OTHER PUBLICATIONS

Japanese Office Action for Japanese Patent Application No. 2023-079267 mailed Jan. 21, 2025.
Japanese Office Action for Japanese Patent Application No. 2023-079267 mailed May 7, 2025.

* cited by examiner

VEHICLE BODY SIDE STRUCTURE

CROSS-REFERENCE TO RELATED APPLICATION

The present application claims priority based on Japanese Patent Application No. 2023-079267, filed May 12, 2023, the content of which is incorporated herein by reference.

BACKGROUND OF THE INVENTION

Field of the Invention

The present invention relates to a vehicle body side structure including a wheel house.

Description of Related Art

As a vehicle body side structure of four-wheeled vehicles, one in which a wheel house is provided to surround an upper outer circumference and a vehicle width direction inner side of a wheel, and a damper base supporting an upper part of a damper of a suspension is attached to an inner surface of an upper region of the wheel house is known (see, for example, Japanese Unexamined Patent Application, First Publication No. 2018-20643).

The vehicle body side structure described in Japanese Unexamined Patent Application, First Publication No. 2018-20643 includes a wheel house inner having a substantially semi-cylindrical circumferential wall and a side wall covering a vehicle width direction inner side of the circumferential wall. In the wheel house inner, the circumferential wall and the side wall are integrally formed by press forming. A thick reinforcing bracket (absorber bracket) is fixed by welding to an inner surface of an upper region of the circumferential wall and an outer surface (a surface facing outward in a vehicle width direction) of the side wall in the wheel house inner. Then, a damper base is fixed by welding to a lower surface of an upper wall of the reinforcing bracket that is fixed to the inner surface of the circumferential wall of the wheel house inner.

In this vehicle body side structure, since the upper region of the circumferential wall and the side wall in the wheel house inner are reinforced by a thick reinforcing member (reinforcing bracket), a suspension load input to the damper base when a vehicle travels can be stably supported by a high-rigidity portion of the wheel house.

SUMMARY OF THE INVENTION

However, in the vehicle body side structure described in Japanese Unexamined Patent Application, First Publication No. 2018-20643, a thick and large-sized reinforcing member is attached to the wheel house inner to enhance the rigidity of the upper region of the circumferential wall and the side wall in the wheel house inner. Therefore, if this vehicle body side structure is employed, the number of parts increases, and this is likely to cause an increase in weight of the vehicle body or a decrease in the degree of freedom in layout of parts inside the wheel house.

An aspect of the present invention is to provide a vehicle body side structure that can enhance a support rigidity of a suspension load input portion of a wheel house while curbing an increase in the number of parts. Then, the aspect of the present invention eventually contributes to energy efficiency.

In order to achieve the objective described above, a vehicle body side structure according to an aspect of the present invention employs the following configuration.

(1) An aspect of the present invention includes a wheel house (for example, the rear wheel house 10 of the embodiment) disposed at a side portion of a vehicle body to surround an upper outer circumference and a vehicle width direction inner side of a wheel (for example, the rear wheel 11 of the embodiment), and a damper base (for example, the damper base 13 of the embodiment) fixed to an inner surface of an upper region (for example, the upper region 10u of the embodiment) of the wheel house to support an upper part of a damper (for example, the damper 12 of the embodiment) of a suspension, in which an upwardly convex three-dimensional curved surface portion (for example, the three-dimensional curved surface portion 18 of the embodiment) curved in all of a side view, a front-rear view, and a vertical view without an inflection point is provided in the upper region of the wheel house, and the damper base is fixed to an inner surface of the three-dimensional curved surface portion.

According to the aspect (1) described above, when a suspension load is input from the damper to the damper base, the load is received by the three-dimensional curved surface portion of the upper region of the wheel house. Since the three-dimensional curved surface portion is formed of a continuous upwardly convex curved surface that is curved in multiple directions without an inflection point, the load input from the damper base can be received in a dispersed manner over the entire surface. Therefore, it is possible to stably receive the suspension load input through the damper base without adding a large-sized reinforcing member spanning from the upper region of the wheel house to the inner region on the vehicle width direction inner side.

(2) In the aspect (1) described above, a three-dimensional curved surface (for example, the three-dimensional curved surface 19 of the embodiment) which is continuous with the three-dimensional curved surface portion, curved in all of a side view, a front-rear view, and a vertical view, and convex inward in a vehicle width direction without an inflection point may be provided in an inner region (for example, the side wall portion 14s of the embodiment) of the wheel house continuous with the vehicle width direction inner side of the upper region.

In this case, when a suspension load is input from the damper to the damper base, the load is received by the entire surface of the three-dimensional curved surface portion of the upper region of the wheel house, and is also received by the entire region of the three-dimensional curved surface of the inner region of the wheel house.

Therefore, if the present configuration is employed, the suspension load input to the damper base can be uniformly received over a wide range of the upper region and the inner region of the wheel house.

(3) In the aspect (1) or (2) described above, a step portion (for example, the step portion 40 of the embodiment) recessed in a direction toward the inside of the wheel house to avoid interference with a component in a vehicle interior (for example, the rear seat 50 of the embodiment) may be provided at a part of the inner region of the wheel house continuous with the vehicle width direction inner side of the upper region, and the three-dimensional curved surface portion to which the damper base is fixed may be formed at a position which does not overlap the step portion in a vehicle body front-rear direction.

In this case, even if it is necessary to provide a step portion for avoiding interference with a component in the vehicle interior in the inner region of the wheel house, since the three-dimensional curved surface portion to which the damper base is fixed is formed at a position that does not overlap the step portion in the vehicle body front-rear direction, a dispersed support effect of the input load due to the three-dimensional curved surface portion can be reliably obtained.

(4) In the aspect (1) described above, the damper base may be fixed only to a single panel member constituting the three-dimensional curved surface portion of the wheel house.

In this case, since the damper base is not fixed across a plurality of members, the input load can be uniformly transmitted to the entire region of the fixed portion of the damper base without variations. Therefore, if the present configuration is employed, the suspension load input from the damper base can be uniformly supported over the entire region of the three-dimensional curved surface portion.

Further, if the damper base is fixed to the three-dimensional curved surface portion of the wheel house by welding, there is no discontinuous portion such as a stepped portion in the welded portion, and thereby welding of the damper base to the three-dimensional curved surface portion can be easily performed.

(5) In the aspect (1) described above, the damper base may be fixed to the three-dimensional curved surface portion by non-penetrating laser welding.

In this case, when the damper base is welded and fixed to the three-dimensional curved surface portion, distortion is less likely to occur in the three-dimensional curved surface portion.

Therefore, if the present configuration is employed, the dispersed support effect of the input load due to the three-dimensional curved surface portion can be more reliably obtained.

(6) In the aspect (1) described above, a curved surface of the three-dimensional curved surface portion may be formed of a catenary curved surface or a curved surface in which a plurality of catenary curved surfaces are combined.

In this case, since the three-dimensional curved surface portion to which the damper base is fixed is formed of a catenary curved surface in which tension is balanced in all directions or a curved surface in which a plurality of catenary curved surfaces are combined, the input suspension load is less likely to be concentrated at one location in the upper region.

Therefore, if the present configuration is employed, the suspension load input to the damper base can be efficiently dispersed and supported by the entire region of the three-dimensional curved surface portion of the wheel house.

According to the aspect of the present invention, the upwardly convex three-dimensional curved surface portion curved in all of a side view, a front-rear view, and a vertical view without an inflection point is provided in the upper region of the wheel house, and the damper base is fixed to an inner surface of the three-dimensional curved surface portion. Therefore, a support rigidity of a suspension load input portion of the wheel house can be enhanced while curbing an increase in the number of parts.

Therefore, if the aspect of the present invention is employed, a weight of the side portion of the vehicle body around the wheel house can be reduced, and the degree of freedom in layout of parts inside the wheel house can be increased. Then, if the aspect of the present invention is employed, it is possible to contribute to energy efficiency.

Also, according to the aspect of the present invention, vibrations input through the damper base can be received by the three-dimensional curved surface portion that is not easily bent, and thereby vehicle vibrations can also be reduced.

DESCRIPTION OF EMBODIMENTS

Figure 1:
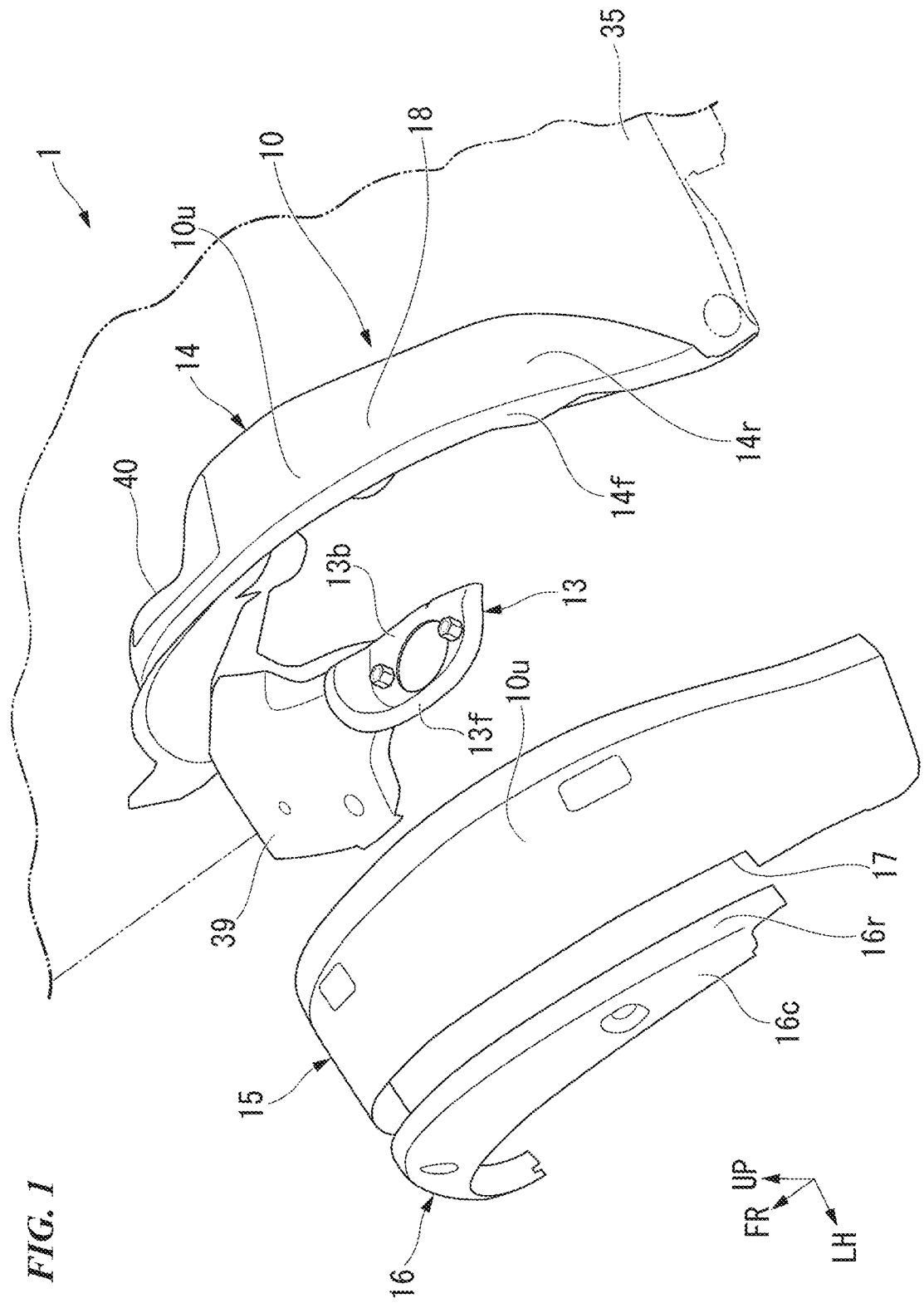
FIG. 1 is an exploded perspective view of a wheel house portion at a left rear part of a vehicle of the embodiment.

Hereinafter, embodiments of the present invention will be described on the basis of the drawings. Further, in the following description, terms such as forward and rearward, upward and downward, and leftward and rightward mean directions with respect to a forward direction of a vehicle unless otherwise specified. Also, an arrow FR indicating a forward direction with respect to the vehicle, an arrow UP indicating an upward direction with respect to the vehicle, and an arrow LH indicating a leftward direction with respect to the vehicle are illustrated at suitable positions in the drawings.

Figure 2:
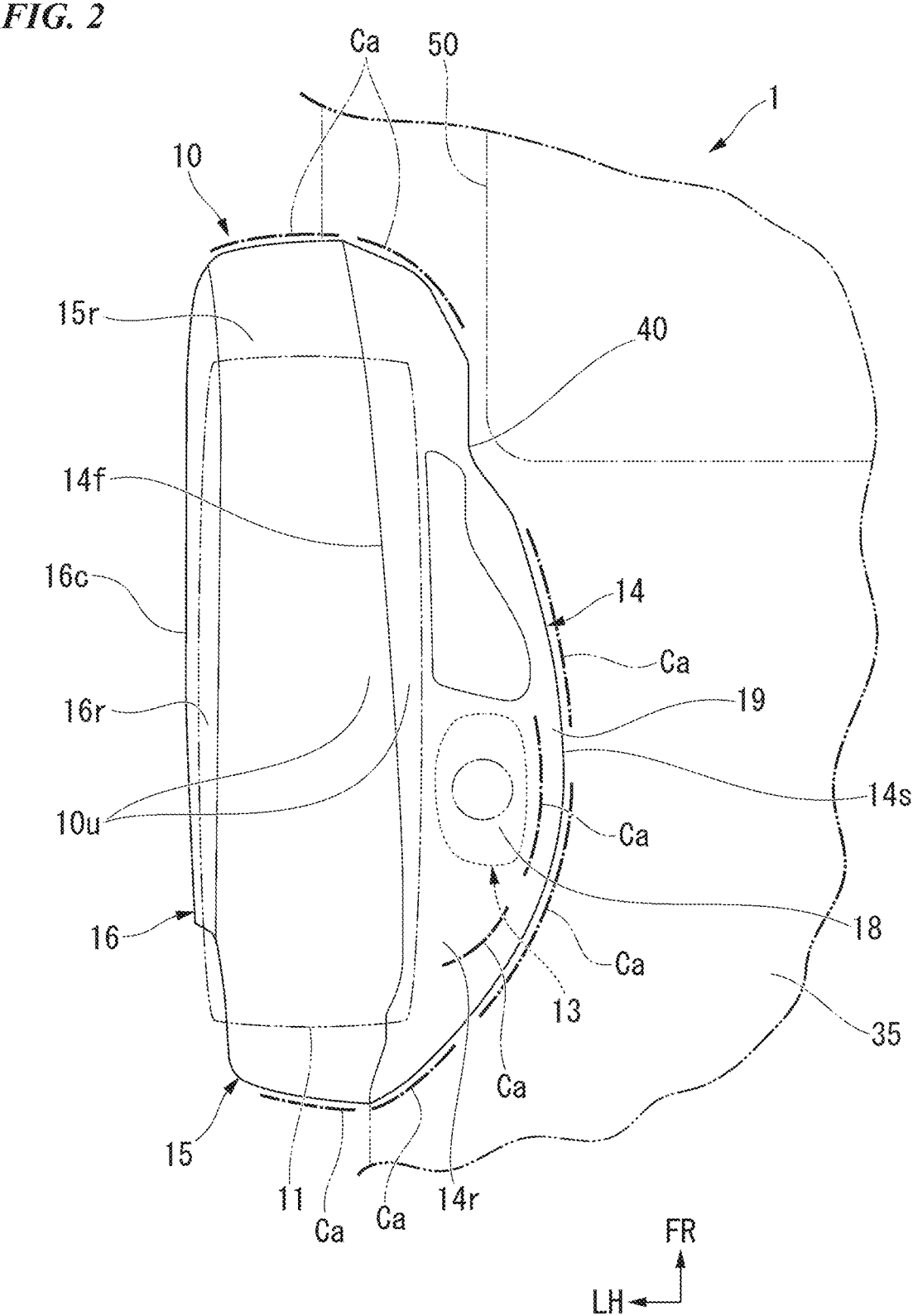
FIG. 2 is a plan view of the wheel house portion at the left rear part of the vehicle of the embodiment.
Figure 3:
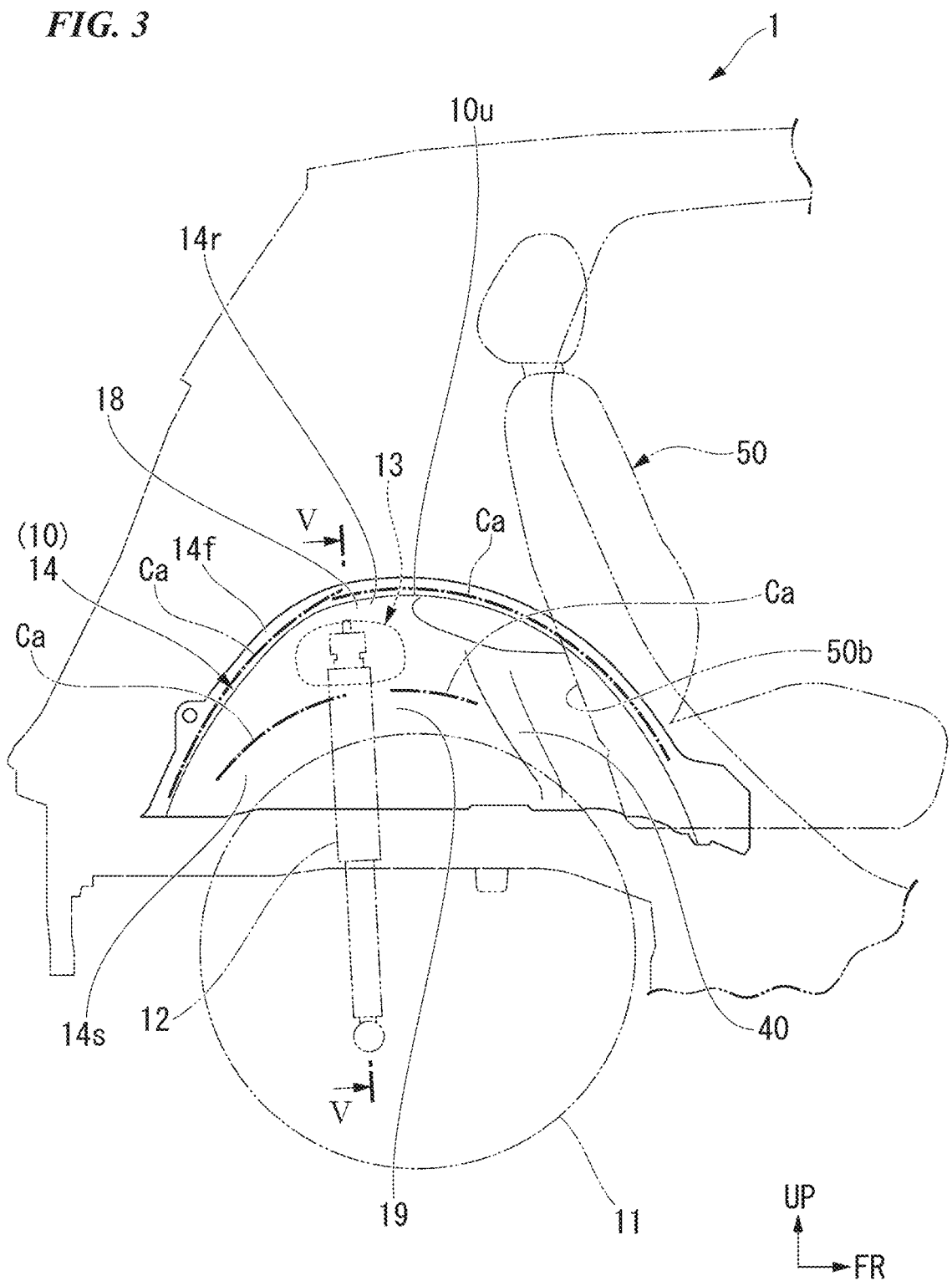
FIG. 3 is a side view of the wheel house portion at the left rear part of the vehicle of the embodiment.
Figure 4:
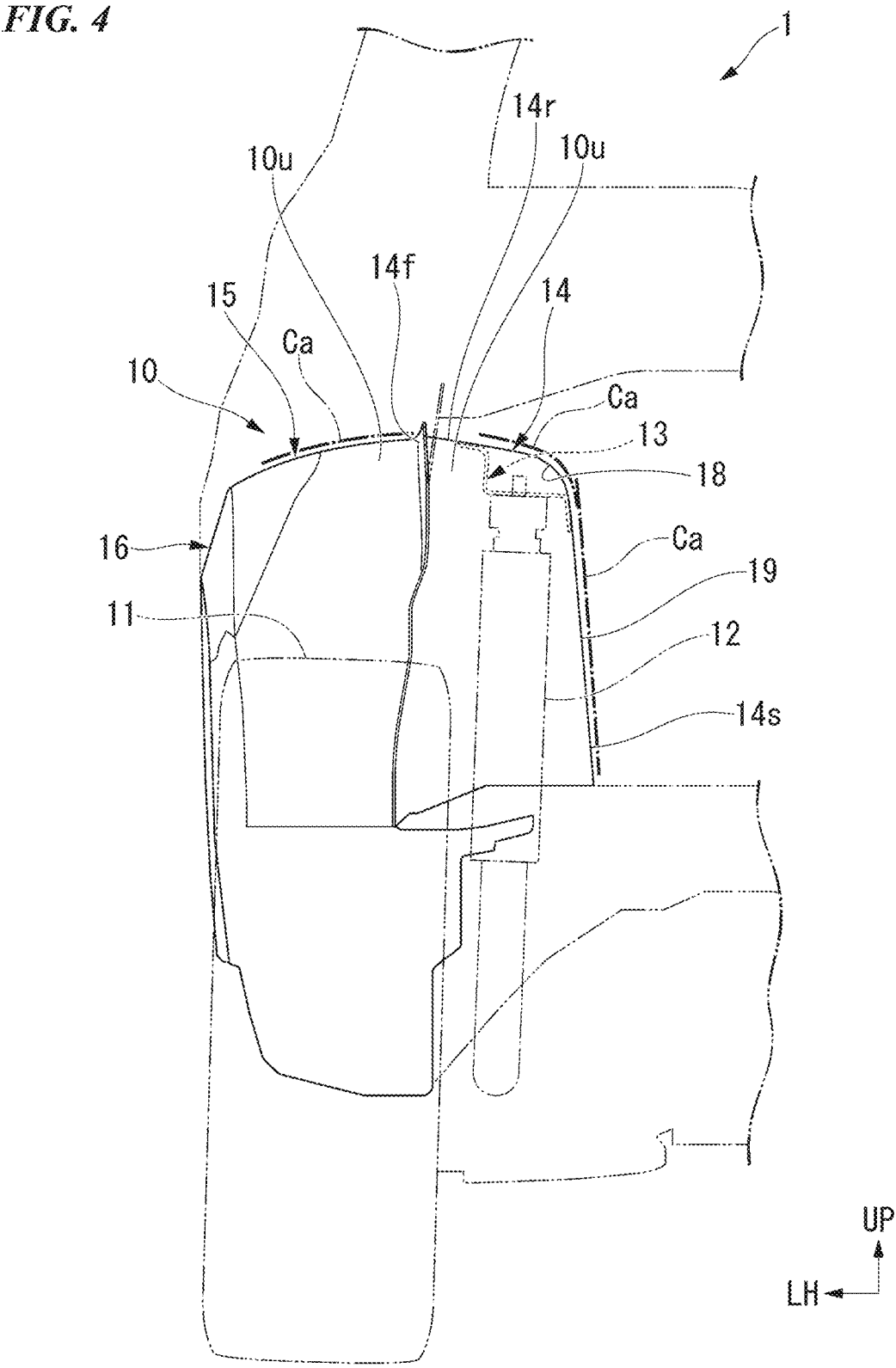
FIG. 4 is a rear view of the wheel house portion at the left rear part of the vehicle of the embodiment.

FIG. 1 is an exploded perspective view of a rear wheel house 10 portion at a left rear part of a vehicle 1 of the present embodiment. FIG. 2 is a plan view of the rear wheel house 10 portion, and FIG. 3 is a side view of the rear wheel house 10 portion from a vehicle width direction inner side. Also, FIG. 4 is a rear view of the rear wheel house 10 portion from the rear of the vehicle, and FIG. 5 is a cross-sectional view along line V-V in FIG. 3.

The rear wheel house 10 (wheel house) is disposed at a side portion of a vehicle body to surround an upper outer circumference and the vehicle width direction inner side of a rear wheel 11 (wheel) of the vehicle 1. A lower end part on the vehicle width direction inner side of the rear wheel house 10 is connected to a rear side frame 34 and a rear floor panel 35 at the rear part of the vehicle as illustrated in FIG. 5. In FIGS. 1 to 5, the rear wheel house 10 on a left side of the vehicle is illustrated, but a rear wheel house on a right side of the vehicle also has a similar structure.

The rear wheel 11 is supported by the vehicle body to be swingable via a suspension arm (not illustrated). The suspension arm is disposed on the vehicle width direction inner side of the rear wheel 11. A spring (not illustrated) and a damper 12 (damping device) of a rear wheel suspension are interposed between the suspension arm and the vehicle body. An upper end part of the damper 12 is supported by an upper region of the rear wheel house 10 via a damper base 13 made of a thick metal material. The damper base 13 is fixed to an inner surface of the upper region of the rear wheel house 10 as will be described in detail later.

Figure 5:
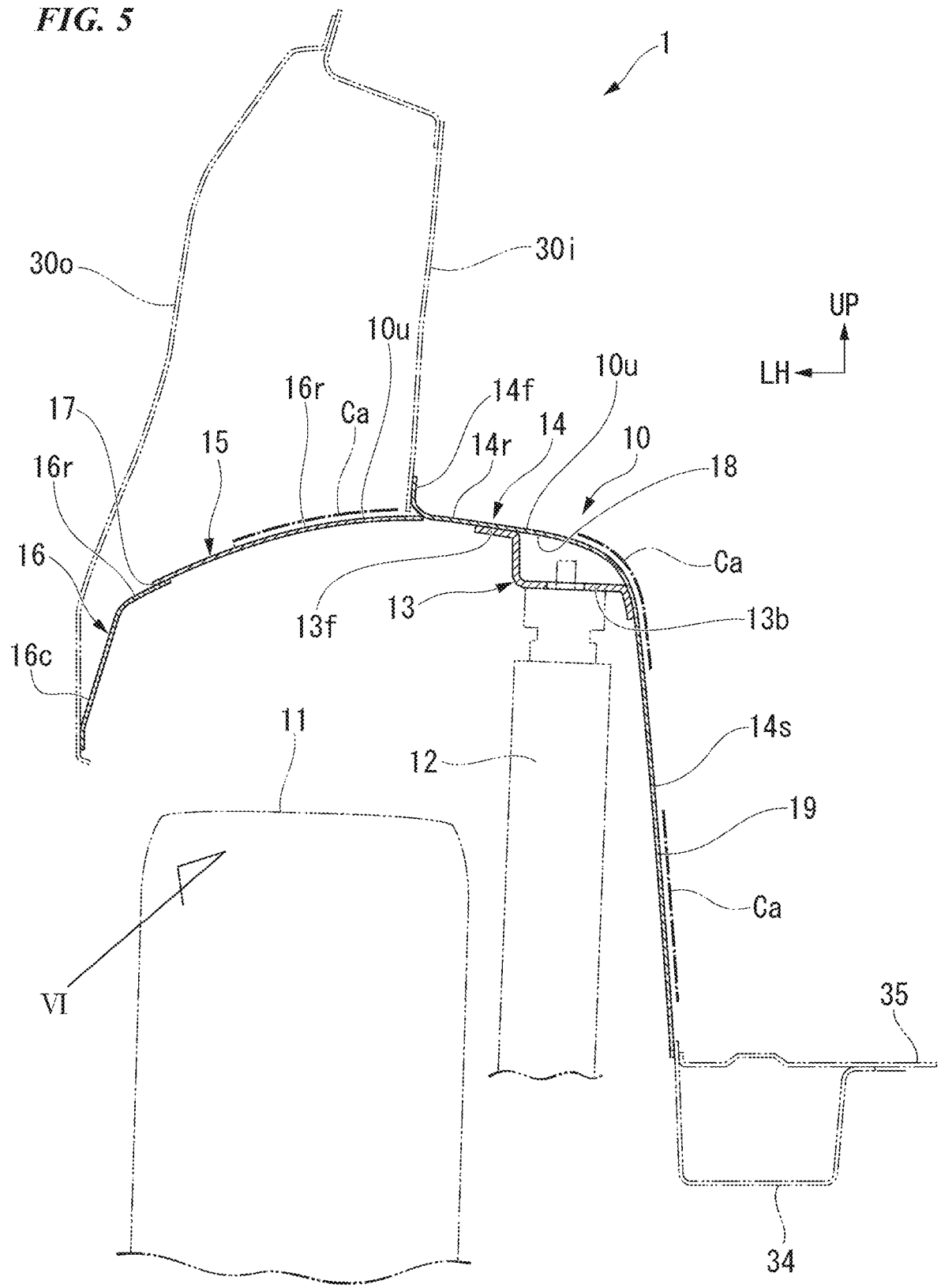
FIG. 5 is a cross-sectional view along line V-V in FIG. 3.

As illustrated in FIG. 1 and FIG. 5, the rear wheel house 10 includes a wheel house inner 14 surrounding an upper outer circumference of the rear wheel 11 on the vehicle width direction inner side and the vehicle width direction inner side of the rear wheel 11, a wheel house outer 15 surrounding an upper outer circumference of the rear wheel 11 on a vehicle width direction outer side, and a wheel house cover 16 fixed to an end part of the wheel house outer 15 on the vehicle width direction outer side.

The wheel house inner 14 includes a substantially semi-cylindrical circumferential wall portion 14r covering the upper outer circumference of the rear wheel 11 on the vehicle width direction inner side, a side wall portion 14s having a substantially semicircular shape in side view and covering the vehicle width direction inner side of the circumferential wall portion 14r, and a joining flange 14f extending outward in a radial direction from an end part of the circumferential wall portion 14r on the vehicle width direction outer side. These circumferential wall portion 14r, side wall portion 14s, and joining flange 14f are integrally formed by press-forming a metal plate material. The circumferential wall portion 14r and the side wall portion 14s are continuous as a smooth curved surface.

The wheel house outer 15 has a substantially semi-cylindrical circumferential wall portion 15r covering an upper outer circumference of the rear wheel 11 on the vehicle width direction outer side. An end part of the circumferential wall portion 15r on the vehicle width direction inner side overlaps an end part of the circumferential wall portion 14r of the wheel house inner 14 on the vehicle width direction outer side from below and is fixed to the circumferential wall portion 14r of the wheel house inner 14 by welding.

As illustrated in FIG. 1, a notch portion 17 is formed at an end part on the vehicle width direction outer side of the circumferential wall portion 15r of the wheel house outer 15. The wheel house cover 16 is welded and fixed to an edge part of the notch portion 17. The wheel house cover 16 is formed of a metal plate made of a different material from the wheel house outer 15. The wheel house cover 16 includes a substantially semi-cylindrical portion 16r that complements the notch portion 17 of the wheel house outer 15, and a substantially arcuate-shaped cover wall 16c extending inward in a radial direction from the vehicle width direction outer side of the substantially semi-cylindrical portion 16r.

Reference sign 39 in FIG. 1 is a side sill end plate joined to lower ends of front edge parts of the wheel house inner 14 and the wheel house outer 15. The side sill end plate 39 is a plate material joined to a rear end part of a side sill (not illustrated) disposed below a side portion of a vehicle interior.

As illustrated in FIG. 5, a lower edge part of a body side panel inner 30i is welded and fixed to the joining flange 14f of the wheel house inner 14. A lower edge part of a body side panel outer 30o is welded and fixed to an outer surface of the cover wall 16c of the wheel house cover 16. Also, upper edge parts of the body side panel inner 30i and the body side panel outer 30o are welded and fixed to each other. The body side panel inner 30i and the body side panel outer 30o, together with the rear wheel house 10, form a closed cross section on an upper side of the rear wheel house 10.

A vicinity of a central portion in a front-rear direction of the circumferential wall portions 14r and 15r of the wheel house inner 14 and the wheel house outer 15 fixed by welding constitutes an upper region 10u of the rear wheel house 10 that convexly bulges upward. An upwardly convex three-dimensional curved surface portion 18 curved in all of a side view (see FIG. 3), a front-rear view (see FIG. 4), and a vertical view (see FIG. 2) without an inflection point is provided in the upper region 10u.

The three-dimensional curved surface portion 18 of the upper region 10u is formed of a catenary curved surface or a curved surface in which a plurality of catenary curved surfaces are combined. Further, an auxiliary line along the catenary curved surface is illustrated at suitable positions in the drawings, and the auxiliary line is denoted by reference sign Ca.

Also, a three-dimensional curved surface 19 that is continuous with the three-dimensional curved surface portion 18 of the upper region 10u, curved in all of a side view (see FIG. 3), a front-rear view (see FIG. 4), and a vertical view (see FIG. 2), and convex inward in the vehicle width direction without an inflection point is formed at a part of an inner region (a part of the side wall portion 14s of the wheel house inner 14) of the rear wheel house 10 continuous with the vehicle width direction inner side of the upper region 10u. The three-dimensional curved surface 19 of the side wall portion 14s of the wheel house inner 14 is formed of a catenary curved surface or a curved surface in which a plurality of catenary curved surfaces are combined.

Also, as illustrated in FIGS. 2 and 3, a rear seat 50, which is a component in the vehicle interior, is installed at a position at a rear part in the vehicle interior close to the rear wheel house 10 (the wheel house inner 14). A step portion 40 for avoiding interference with the rear seat 50 is provided at a portion of the wheel house inner 14 on a front end side of the side wall portion 14s (the inner region). The step portion 40 is gently recessed in a direction toward the inside of the rear wheel house 10 (outward in the vehicle width direction) along an inclination of a seat back 50b of the rear seat 50.

Figure 6:
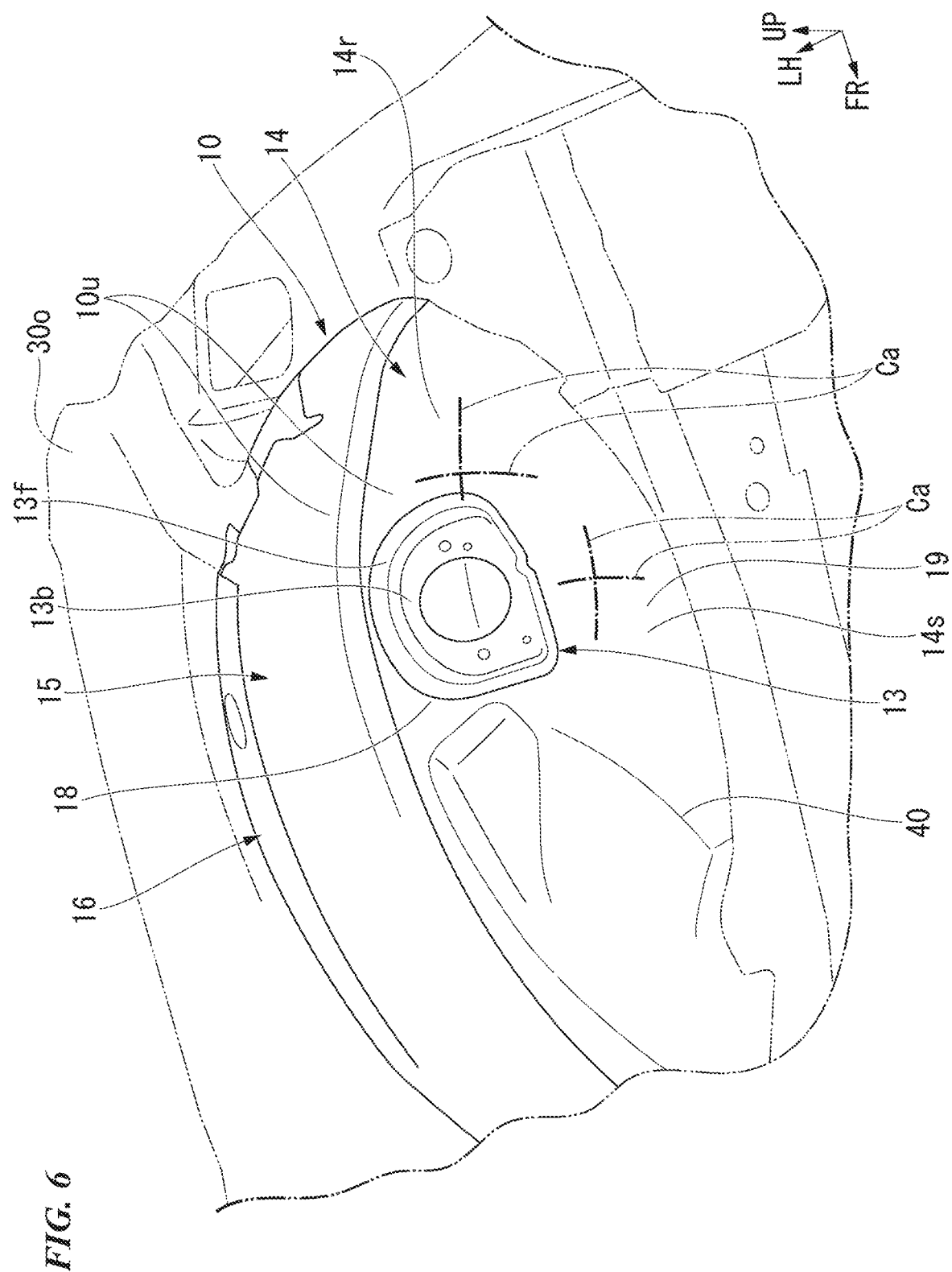
FIG. 6 is a perspective view of the wheel house portion at the left rear part of the vehicle of the embodiment corresponding to a direction indicated by an arrow VI in FIG. 5.

FIG. 6 is a perspective view of the vehicle 1 corresponding to a direction indicated by an arrow VI in FIG. 5.

As illustrated in FIGS. 1, 5, and 6, the damper base 13 includes a fastening wall 13b having a substantially elliptical shape in a plan view and to which an upper end part of the damper 12 is fastened and fixed, and a welding flange 13f disposed to surround an outer side of the fastening wall 13b. The welding flange 13f is abutted against an inner surface of the three-dimensional curved surface portion 18 provided in the upper region 10u of the rear wheel house 10 and is welded and fixed to the three-dimensional curved surface portion 18 by non-penetrating welding such as a tailored blank or the like. An upper surface of the welding flange 13f is formed in a curved surface shape along an abutment surface of the three-dimensional curved surface portion 18. A portion of the three-dimensional curved surface portion 18 to which the damper base 13 is welded and fixed is at a position on an inner surface of the circumferential wall portion 14r of the wheel house inner 14 and offset to the rear side of the vehicle body with respect to the step portion 40 of the side wall portion 14s. Therefore, the three-dimensional curved surface portion 18 to which the damper base 13 is fixed is formed at a position that does not overlap the step portion 40 in the vehicle body front-rear direction.

Also, the welding flange 13f of the damper base 13 is welded and fixed only to an inner surface of the wheel house inner 14, and is not welded across the wheel house outer 15 side. Therefore, the damper base 13 is fixed only to a single panel member constituting the upper region 10u of the rear wheel house 10.

As described above, in the vehicle body side structure of the above-described embodiment, the upwardly convex three-dimensional curved surface portion 18 curved in all of a side view, a front-rear view, and a vertical view without an inflection point is formed in the upper region of the rear wheel house 10, and the damper base 13 is fixed to the inner surface of the three-dimensional curved surface portion 18. Therefore, if a suspension load is input from the damper 12 to the damper base 13 when the vehicle 1 travels or the like, the load is received by the three-dimensional curved surface portion 18 of the upper region 10*u* of the rear wheel house 10.

Since the three-dimensional curved surface portion 18 of the rear wheel house 10 is formed of a continuous upwardly convex curved surface that is curved in multiple directions without an inflection point, the suspension load input from the damper base 13 can be received in a dispersed manner over the entire surface. Therefore, the vehicle body side structure of the above-described embodiment can stably receive the suspension load input through the damper base 13 without adding a large-sized reinforcing member spanning from the upper region 10*u* of the rear wheel house 10 to the side wall portion 14*s* on the vehicle width direction inner side. Therefore, a support rigidity of a suspension load input portion of the rear wheel house 10 can be enhanced while curbing an increase in the number of parts.

Therefore, if the vehicle body side structure of the above-described embodiment is employed, a weight of the side portion of the vehicle body around the rear wheel house 10 can be reduced, and the degree of freedom in layout of parts inside the rear wheel house 10 can be increased. Then, when the vehicle body side structure of the above-described embodiment is employed, it is possible to contribute to energy efficiency.

Also, in the vehicle body side structure of the above-described embodiment, since the damper base 13 is fixed to the inner surface of the three-dimensional curved surface portion 18 provided in the upper region 10*u* of the rear wheel house 10, vibrations input through the damper base 13 can be received by the three-dimensional curved surface portion 18 that is not easily bent. Therefore, if the present configuration is employed, generation of vibration noise in the rear wheel house 10 can be suppressed.

Also, in the vehicle body side structure of the above-described embodiment, the three-dimensional curved surface 19 that is continuous with the three-dimensional curved surface portion 18 of the upper region 10*u*, curved in all of a side view, a front-rear view, and a vertical view, and convex inward in the vehicle width direction without an inflection point is provided on the side wall portion 14*s* (the inner region) of the rear wheel house 10. Therefore, when a suspension load is input from the damper 12 to the damper base 13, the load is received by the entire surface of the three-dimensional curved surface portion 18 of the upper region 10*u* of the rear wheel house 10, and is also received by the entire region of the three-dimensional curved surface 19 of the side wall portion 14*s* (the inner region) of the rear wheel house 10.

Therefore, if the present configuration is employed, the suspension load input to the damper base 13 can be uniformly received over a wide range of the upper region 10*u* and the side wall portion 14*s* (the inner region) of the rear wheel house 10. Therefore, if the present configuration is employed, the support rigidity of the suspension load input portion of the rear wheel house 10 can be further enhanced.

Also, in the vehicle body side structure of the above-described embodiment, the three-dimensional curved surface portion 18 of the rear wheel house 10 to which the damper base 13 is fixed is formed at a position that does not overlap the step portion 40 for avoiding interference with the rear seat 50 in the vehicle body front-rear direction. Therefore, even in a case in which the step portion 40 for avoiding interference with the rear seat 50 has to be provided at a part of the side wall portion 14*s* of the rear wheel house 10, a dispersed support effect of the input load due to the three-dimensional curved surface portion 18 can be reliably obtained without being hindered by the step portion 40.

Therefore, if the present configuration is employed, the degree of freedom in layout of members in the vehicle can be further increased.

Further, in the vehicle body side structure of the above-described embodiment, the damper base 13 is fixed only to the wheel house inner 14 (only to a single panel member) among the members constituting the three-dimensional curved surface portion 18 of the rear wheel house 10. In this case, since the damper base 13 is not fixed across a plurality of members constituting the upper region 10*u*, the input load can be uniformly transmitted to the entire region of the fixed portion of the damper base 13 without variations.

Therefore, if the present configuration is employed, the suspension load input from the damper base 13 can be more uniformly supported over the entire region of the three-dimensional curved surface portion 18.

Also, if the present configuration is employed, when the damper base 13 is fixed to the three-dimensional curved surface portion 18 of the rear wheel house 10 by welding, there is no discontinuous portion such as a stepped portion in the welded portion, and thereby welding of the damper base 13 to the three-dimensional curved surface portion 18 can be easily performed.

Also, in the vehicle body side structure of the above-described embodiment, the damper base 13 is fixed to the three-dimensional curved surface portion 18 of the rear wheel house 10 by non-penetrating laser welding. Therefore, when the damper base 13 is welded and fixed to the three-dimensional curved surface portion 18, distortion is less likely to occur in the three-dimensional curved surface portion 18.

Therefore, if the present configuration is employed, the dispersed support effect of the input load due to the three-dimensional curved surface portion 18 can be more reliably obtained.

Also, in the vehicle body side structure of the above-described embodiment, the curved surface of the three-dimensional curved surface portion 18 of the rear wheel house 10 is formed of a catenary curved surface or a curved surface in which a plurality of catenary curved surfaces are combined. In this case, since the three-dimensional curved surface portion 18 to which the damper base 13 is fixed is formed of a catenary curved surface in which tension is balanced in all directions or a curved surface in which a plurality of catenary curved surfaces are combined, the input suspension load is less likely to be concentrated at one location in the upper region 10*u* of the rear wheel house 10.

Therefore, if the present configuration is employed, the suspension load input to the damper base 13 can be efficiently dispersed and supported by the entire region of the three-dimensional curved surface portion 18 of the rear wheel house 10.

The present invention is not limited to the above-described embodiment, and various modifications can be made in design in a range not departing from the gist of the present invention. For example, in the above-described embodiment, the damper base 13 is fixed to the inner surface of the three-dimensional curved surface portion 18 of the rear wheel house 10 by non-penetrating welding, but a form of fixing the damper base 13 to the three-dimensional curved surface portion 18 is not limited thereto. The damper base 13 may be fixed to the three-dimensional curved surface portion 18 by welding other than the non-penetrating welding. Also, the damper base 13 may be fixed to the three-dimensional curved surface portion 18 using an industrial adhesive or the like.

Also, in the above-described embodiment, the three-dimensional curved surface portion 18 is provided in the upper region 10u of the rear wheel house 10 at the rear part of the vehicle, and the damper base 13 is fixed to the inner surface of the three-dimensional curved surface portion 18. However, a three-dimensional curved surface portion may be similarly provided in an upper region of a front wheel house at the front part of the vehicle, and a damper base may be fixed to an inner surface of the three-dimensional curved surface portion.

Also, in the above-described embodiment, the damper base 13 is welded and fixed only to the wheel house inner 14 among the members constituting the three-dimensional curved surface portion 18 of the upper region 10u of the rear wheel house 10. However, the damper base 13 can also be fixed to straddle the wheel house inner 14 and the wheel house outer 15.

Further, in the above-described embodiment, the wheel house cover 16 joined to the vehicle width direction outer side of the wheel house outer 15 is not a member constituting a part of the three-dimensional curved surface portion 18, but an upper region of the wheel house cover 16 may also constitute a part of the three-dimensional curved surface portion 18.

Also, in the above-described embodiment, the rear wheel house 10 (wheel house) is constituted by a plurality of members, but the wheel house may be constituted by a single member.

Also, in the above-described embodiment, the step portion 40 is provided at a part of the side wall portion 14s of the rear wheel house 10 (wheel house), but the wheel house is desirable to have a structure without a step portion. In this case, the support rigidity of the suspension load input portion of the wheel house can be enhanced more efficiently.

BRIEF DESCRIPTION OF THE REFERENCE SYMBOLS

10: Rear wheel house (wheel house)
10u: Upper region
11: Rear wheel (wheel)
12: Damper
13: Damper base
14s: Side wall portion (inner region)
18: Three-dimensional curved surface portion
19: Three-dimensional curved surface
40: Step portion
50: Rear seat (component in vehicle interior)

What is claimed is:

1. A vehicle body side structure comprising:
a wheel house disposed at a side portion of a vehicle body to surround an upper outer circumference and a vehicle width direction inner side of a wheel; and
a damper base fixed to an inner surface of an upper region of the wheel house to support an upper part of a damper of a suspension, wherein
an upwardly convex three-dimensional curved surface portion curved in all of a side view, a front-rear view, and a vertical view without an inflection point is provided in the upper region of the wheel house,
the damper base is fixed to an inner surface of the upwardly convex three-dimensional curved surface portion,
a rear seat is installed at a position at a rear part in a vehicle interior close to the wheel house,
a step portion is provided that is recessed along an inclination of the rear seat in a direction toward the inside of the wheel house to avoid interference with the rear seat at a portion on a front end side of an inner region of the wheel house continuous with the vehicle width direction inner side of the upper region, and
the upwardly convex three-dimensional curved surface portion to which the damper base is fixed is formed at a position which does not overlap the step portion in a vehicle body front-rear direction.

2. The vehicle body side structure according to claim 1, wherein a three-dimensional curved surface which is continuous with the upwardly convex three-dimensional curved surface portion, curved in all of a side view, a front-rear view, and a vertical view, and convex inward in a vehicle width direction without an inflection point is provided in the inner region.

3. The vehicle body side structure according to claim 1, wherein the damper base is fixed only to a single panel member constituting the upwardly convex three-dimensional curved surface portion of the wheel house.

4. The vehicle body side structure according to claim 1, wherein the damper base is fixed to the upwardly convex three-dimensional curved surface portion by non-penetrating laser welding.

5. The vehicle body side structure according to claim 1, wherein a curved surface of the upwardly convex three-dimensional curved surface portion is formed of a catenary curved surface or a curved surface in which a plurality of catenary curved surfaces are combined.

* * * * *